United States Patent
Ohtake et al.

(10) Patent No.: US 8,530,555 B2
(45) Date of Patent: Sep. 10, 2013

(54) POLYBUTYLENE TEREPHTHALATE RESIN COMPOSITION

(75) Inventors: Fumiyuki Ohtake, Shizuoka (JP); Kouichi Sakata, Shizuoka (JP)

(73) Assignee: Wintech Polymer Ltd., Konan, Minato-Ku, Tokyo (JP)

( * ) Notice: Subject to any disclaimer, the term of this patent is extended or adjusted under 35 U.S.C. 154(b) by 0 days.

(21) Appl. No.: 13/508,653

(22) PCT Filed: Nov. 10, 2010

(86) PCT No.: PCT/JP2010/069998
§ 371 (c)(1), (2), (4) Date: May 8, 2012

(87) PCT Pub. No.: WO2011/058992
PCT Pub. Date: May 19, 2011

(65) Prior Publication Data
US 2012/0232200 A1 Sep. 13, 2012

(30) Foreign Application Priority Data
Nov. 10, 2009 (JP) ................. 2009-256749

(51) Int. Cl.
*C08L 67/03* (2006.01)
*C08K 13/02* (2006.01)

(52) U.S. Cl.
USPC ....................................... 524/195

(58) Field of Classification Search
USPC ....................................... 524/195
See application file for complete search history.

(56) References Cited

U.S. PATENT DOCUMENTS 6,512,027 B2 * 1/2003 Kanai et al. ............... 523/511

FOREIGN PATENT DOCUMENTS

| CN | 1980996 A | | 6/2007 |
|---|---|---|---|
| CN | 101218305 A | | 7/2008 |
| JP | 63-3055 A | | 1/1988 |
| JP | 09-124908 | * | 5/1997 |
| JP | 2004-91583 A | | 3/2004 |
| JP | 2004-143207 A | | 5/2004 |
| JP | 2004-143211 A | | 5/2004 |
| JP | 2006-45525 A | | 2/2006 |
| JP | 2007-231051 A | | 9/2007 |
| JP | 2007-234260 A | | 9/2007 |

OTHER PUBLICATIONS

Machine translation of JP 09-124908. May 1997.*
Machine translation of JP 2006-045525. Feb. 2006.*
Machine translation of JP 2007-231051. Sep. 2007.*
International Search Report for PCT/JP2010/069998, mailed Dec. 7, 2010.
Notice of Reasons for Rejection issued to Chinese Application No. 201080050564.6, mailed Feb. 27, 2013.

* cited by examiner

*Primary Examiner* — John Uselding
(74) *Attorney, Agent, or Firm* — Hoffman & Baron, LLP

(57) ABSTRACT

To provide a polybutylene terephthalate resin composition that excels in the anti-heat shock property, flame retardation and hydrolysis resistance. A polybutylene terephthalate resin composition is prepared by combining a halogenated benzylacrylate compound, an antimony oxide compound and a carbodiimide compound with the polybutylene terephthalate resin. The content of the carbodiimide compound may be an amount that makes the amount of the carbodiimide functional group to be at least 0.3 equivalents and no more than 5.0 equivalents, when the terminal carboxyl equivalent of the polybutylene terephthalate is set as 1.

6 Claims, No Drawings

POLYBUTYLENE TEREPHTHALATE RESIN COMPOSITION

CROSS-REFERENCE TO RELATED APPLICATIONS

This application is the National Stage of International Application No. PCT/JP2010/069998, filed Nov. 10, 2010, which claims the benefit of Japanese Application No. 2009-256749, filed Nov. 10, 2009, the entire contents of both of which are incorporated by reference herein.

FIELD OF THE INVENTION

The present invention relates to a polybutylene terephthalate resin composition that excels in heat shock resistance, flame retardancy and hydrolysis resistance, and it also relates to an insert molded article having excellent heat shock resistance, which is formed by insert molding of the resin composition and a metal or an inorganic solid.

BACKGROUND OF THE INVENTION

Polybutylene terephthalate resin is used in a wide range of fields, such as automobile parts, electric/electronic parts due to the excellent mechanical properties, electric properties, and other physical and chemical properties, along with good workability. In particular, since its heat resistance and strength can be improved by adding a fibrous filler such as glass fiber thereto, the polybutylene terephthalate resin is often used as a polybutylene terephthalate resin composition reinforced with the fibrous filler.

Although the polybutylene terephthalate resin has excellent properties as described above, being a polyester resin, it also has a disadvantage that the physical properties are easily impaired according to hydrolysis. In this connection, it is well known that the hydrolysis resistance can be improved by adding a carbodiimide compound to the polybutylene terephthalate resin.

In particular, the polybutylene terephthalate resin composition having modified physical properties according to addition of a fibrous filler or a carbodiimide compound is often used as a material of a housing for a sensor or an engine control unit, which is used for electric control in the automobile field. When the product used for such purpose is an insert molded article, it is used under an environment of severe temperature increase and decrease, such as engine room of automobile, and therefore a crack may be easily caused by deformation resulting from the difference in linear expansion between a metal insert and the polybutylene terephthalate resin. For such reasons, a product used for such purpose is required to have heat shock resistance for prevention of crack generation that is caused by a severe difference in temperature. The product used for such purpose is sometimes also required to have high flame retardancy.

In an electric automobile field, in particular, it is believed that the flame retardancy is often required as well the durability that has been generally regarded necessary in the automobile field.

In consideration of the circumstances described above, studies have been made for inhibiting crack generation that is caused by heat shock due to severe temperature increase and decrease. For example, a polybutylene terephthalate resin composition in which acrylic rubber, an epoxy compound, pentaerythritol ester, a fibrous reinforcing agent, and a carbodiimide compound are added is suggested (Patent Literature 1).

[Patent Literature 1] Japanese Patent Application Laid-Open (JP-A) No. 63-003055

SUMMARY OF THE INVENTION

Problems to be Solved by the Invention

The polybutylene terephthalate resin composition disclosed in Patent Literature 1 exhibited improved heat shock resistance and improved hydrolysis resistance but improved flame retardancy is not shown. In this connection, although it is desired to obtain a polybutylene terephthalate resin composition with flame retardancy in which a carbodiimide compound is contained, a certain kind of side reaction caused by high reactivity of a carbodiimide compound occurs even when a commonly-used flame retardant like brominated polycarbonate is used in combination with a carbodiimide compound, for example, and therefore an effect of improving desired heat shock resistance is not obtained. Thus, for obtaining flame retardancy of a polybutylene terephthalate resin composition in which a carbodiimide compound is contained, no satisfying result has been obtained so far.

The present invention is devised to solve the problems described above and an object of the invention is to provide a polybutylene terephthalate resin composition that excels in the heat shock resistance, flame retardancy, and hydrolysis resistance.

Means for Solving the Problems

Inventors of the invention conducted intensive studies to solve the problems described above. As a result, it was found that the problem can be solved when a polybutylene terephthalate resin composition is prepared by combining a halogenated benzyl acrylate compound, an antimony oxide compound and a carbodiimide compound with the polybutylene terephthalate resin, and the invention is accomplished accordingly. Specifically, provided the invention is as follows.

(1) A polybutylene terephthalate resin composition, containing:
 (A) a polybutylene terephthalate resin,
 (B) a halogenated benzylacrylate compound,
 (C) an antimony oxide compound, and
 (D) a carbodiimide compound.

(2) The polybutylene terephthalate resin composition described in (1) above, in which content of the (D) carbodiimide compound is an amount that makes the amount of the carbodiimide functional group to be at least 0.3 equivalents and no more than 5.0 equivalents, when the terminal carboxyl equivalent of the polybutylene terephthalate resin is set as 1.

(3) The polybutylene terephthalate resin composition described in (1) or (2) above, in which an amount of a terminal carboxyl of the (A) polybutylene terephthalate resin is no more than 30 meq/kg.

(4) The polybutylene terephthalate resin composition according to any one of (1) to (3) above, in which it further contains (E) a filler.

(5) The polybutylene terephthalate resin composition described in (4) above, in which the (E) filler is a glass fiber.

(6) The polybutylene terephthalate resin composition according to any one of (1) to (5) above, in which it further contains (F) an elastomer.

(7) The polybutylene terephthalate resin composition according to any one of (1) to (6) above, in which content of the (B) halogenated benzylacrylate compound is at least 10 parts by mass and no more than 35 parts by mass and content of the (C) antimony oxide compound is at least 1 part by mass and no more than 20 parts by mass per 100 parts by mass of the (A) polybutylene terephthalate resin.

(8) An insert molded article formed by insert molding of the resin composition described in any one of (1) to (7) above and a metal or an inorganic solid.

Effects of the Invention

According to the invention, by adding a polybutylene terephthalate resin, a halogenated benzylacrylate compound, an antimony oxide compound, and a carbodiimide compound to a polybutylene terephthalate resin composition, a polybutylene terephthalate resin composition that excels in the heat shock resistance, flame retardancy, and hydrolysis resistance is obtained.

DETAILED DESCRIPTION OF THE INVENTION

Herein below, preferred embodiments of the invention are explained in detail. However, the invention is not limited at all to the embodiments, and appropriate modifications can be made within the purpose of the invention. Further, when the same explanation is applied, it may not be repeated. However, gist of the invention is not limited by it.

Herein below, the (A) polybutylene terephthalate resin, the (B) halogenated benzylacrylate compound, the (C) antimony oxide compound, the (D) carbodiimide compound, the (E) filler, the (F) elastomer, and other components as well as a method of producing the polybutylene terephthalate resin composition are explained in order.

[(A) Polybutylene Terephthalate Resin]

The (A) polybutylene terephthalate resin which is used for the terephthalate resin composition of the invention is a polybutylene terephthalate-based resin which is obtained by polycondensation of a dicarboxylic acid component containing at least terephthalic acid or an ester-forming derivative thereof (C1 to C6 alkyl ester or acid halide or the like) and a glycol component containing alkylene glycol with at least four carbon atoms (1,4-butane diol) or an ester-forming derivative thereof. The polybutylene terephthalate resin is not limited to the homo-polybutylene terephthalate resin, and it may be a copolymer containing 60% by mole or more (specifically from 75% by mole to 95% by mole) of butylene terephthalate unit.

The amount of terminal carboxyl groups in the (A) polybutylene terephthalate resin that is used in the invention is not specifically limited as long as the purpose of the invention is not impaired. The amount of terminal carboxyl groups in the polybutylene terephthalate resin that is used in the invention is preferably 30 meq/kg or less, and more preferably 25 meq/kg or less. When the polybutylene terephthalate resin having terminal carboxyl groups in an amount within the above range is used, the polybutylene terephthalate resin composition obtained has excellent heat shock resistance, in particular, and it does not easily have the lowering of the strength by hydrolysis in a moist-heat environment.

The lower limit of the amount of terminal carboxyl groups in the (A) polybutylene terephthalate resin is preferably 5 meq/kg or more, although not specifically limited. In general, the polybutylene terephthalate resin having less than 5 meq/kg of the amount of terminal carboxyl groups is difficult to be produced. Further, when the polybutylene terephthalate resin having the above amount of terminal carboxyl groups is used, the polybutylene terephthalate resin composition having excellent heat shock resistance can be easily prepared.

Furthermore, the intrinsic viscosity of the (A) polybutylene terephthalate resin used in the invention is not specifically limited as long as the purpose of the invention is not impaired. The intrinsic viscosity (IV) of the (A) polybutylene terephthalate resin is preferably 0.60 dL/g or more and 1.2 dL/g or less. More preferably, it is 0.65 dL/g or more and 0.9 dL/g or less. By using the polybutylene terephthalate resin having the intrinsic viscosity within the above range, the polybutylene terephthalate resin composition having particularly excellent moldability can be obtained. The intrinsic viscosity can be also adjusted by blending a polybutylene terephthalate resin having different intrinsic viscosity. For example, by blending a polybutylene terephthalate resin having an intrinsic viscosity of 1.0 dL/g with a polybutylene terephthalate resin having an intrinsic viscosity of 0.7 dL/g, a polybutylene terephthalate resin having an intrinsic viscosity of 0.9 dL/g can be prepared. The intrinsic viscosity (IV) of the (A) polybutylene terephthalate resin can be determined, for example, in o-chlorophenol at the condition of temperature of 35° C.

In the (A) polybutylene terephthalate resin that is used in the invention, examples of the dicarboxylic acid component (comonomer component) other than terephthalic acid and an ester-forming derivative thereof include C8-C14 aromatic dicarboxylic acid including isophthalic acid, phthalic acid, 2,6-naphthalene dicarboxylic acid, and 4,4'-dicarboxy diphenyl ether; C4-C16 alkyl dicarboxylic acid including succinic acid, adipic acid, azelaic acid, and sebacic acid; C5-C10 cycloalkyl dicarboxylic acid including cyclohexane dicarboxylic acid; and an ester-forming derivative of those dicarboxylic acid components (C1-C6 alkyl ester derivatives or acid halides or the like). These dicarboxylic acid components can also be used alone or in combination of two or more thereof.

Among the dicarboxylic acid components described above, preferable dicarboxylic acid component includes C8-C12 aromatic dicarboxylic acid such as isophthalic acid and C6-C12 alkyl dicarboxylic acid such as adipic acid, azelaic acid, and sebacic acid.

Examples of glycol component (comonomer component) other than 1,4-butane diol that is included in the polybutylene terephthalate resin used in the invention include C2-C10 alkylene glycol such as ethylene glycol, propylene glycol, trimethylene glycol, 1,3-butylene glycol, hexamethylene glycol, neopentyl glycol, or 1,3-octane diol; polyoxy alkylene glycol such as diethylene glycol, triethylene glycol, or dipropylene glycol; alicyclic diol such as cyclohexane dimethanol or hydrogenated bisphenol A; aromatic diol such as bisphenol A or 4,4'-dihydroxy biphenyl; C2-C4 alkylene oxide adduct of bisphenol A such as 2-mole adduct of ethylene oxide of bisphenol A or 3-mole adduct of propylene oxide of bisphenol A; and an ester-forming derivative thereof (e.g., acetylated product or the like). These glycol components can also be used alone or in combination of two or more thereof.

Among the glycol components described above, preferred glycol component includes C2-C6 alkylene glycol such as ethylene glycol or trimethylene glycol, polyoxyalkylene glycol such as diethylene glycol, and alicyclic diol such as cyclohexane dimethanol.

Any of the polybutylene terephthalate copolymer obtained by copolymerization of the above comonomer components can preferably be used as the (A) polybutylene terephthalate resin. Further, as the (A) polybutylene terephthalate resin, the combined use of homo-polybutylene terephthalate polymer and polybutylene terephthalate copolymer may be made.

[(B) Halogenated Benzylacrylate Compound]

The polybutylene terephthalate resin composition of the invention contains the (B) halogenated benzylacrylate compound as a flame retardant. In the polybutylene terephthalate resin composition of the invention, the (B) halogenated benzylacrylate compound and the (D) carbodiimide compound that is described below, are used in combination, and therefore the polybutylene terephthalate resin composition is provided with high flame retardancy and an effect of significantly improving heat shock resistance is obtained. When a flame retardant other than the (B) halogenated benzylacrylate compound and the (D) carbodiimide compound are added in combination to a polybutylene terephthalate resin, an effect of improving heat shock resistance is minor.

The (B) halogenated benzylacrylate compound used in the invention is a polymer containing a unit derived from pentabromobenzyl acrylate and/or pentabromobenzyl methacrylate. Molecular weight of the (B) halogenated benzylacrylate compound is not specifically limited if it is within the range in which the purpose of the invention is not impaired. Preferably, it is from 10,000 to 100,000. Specific examples of the halogenated benzylacrylate compound that can be suitably used in the invention include a pentabromobenzyl acrylate polymer which is a homopolymer of pentabromobenzyl acrylate.

Use amount of the (B) halogenated benzylacrylate compound in the invention is not specifically limited if it is within the range in which the purpose of the invention is not impaired. Use amount of the (B) halogenated benzylacrylate compound is preferably 10 parts by mass or more and 35 parts by mass or less, and more preferably 15 parts by mass or more and 30 parts by mass or less per 100 parts by mass of the (A) polybutylene terephthalate resin. By using the (B) halogenated benzylacrylate compound in an amount within the range above, a polybutylene terephthalate resin composition having not only excellent flame retardancy and heat shock resistance but also excellent mechanical properties can be produced.

[(C) Antimony Oxide Compound]

The polybutylene terephthalate resin composition of the invention contains the (C) antimony oxide compound as a flame retardant assistant. Examples of the (C) antimony oxide compound that is used in the invention include antimony trioxide, antimony pentoxide, and sodium antimony acid.

Use amount of the (C) antimony oxide compound is not specifically limited if it is within the range in which the purpose of the invention is not impaired. Use amount of the (C) antimony oxide compound is preferably 1 parts by mass or more and 20 parts by mass or less, and more preferably 2 parts by mass or more and 15 parts by mass or less per 100 parts by mass of the (A) polybutylene terephthalate resin. By using the (C) antimony oxide compound in an amount within the range above, a polybutylene terephthalate resin composition having particularly excellent flame retardancy can be produced.

[(D) Carbodiimide Compound]

The (D) carbodiimide compound used in the invention is not specifically limited if it is a compound having carbodiimide group (—N=C=N—) in the molecule. A group bonding to the carbodiimide group in the (D) carbodiimide compound that is used invention is not specifically limited, and examples thereof include an aliphatic group, an alicyclic group, an aromatic group, and a group to which such organic group is bonded (for example, a benzyl group, a phenethyl group, and a 1,4-xylylene group). Examples of the carbodiimide compound that is suitably used in the invention include an aliphatic carbodiimide compound having an aliphatic group bonded to the carbodiimide group, an alicyclic carbodiimide compound having an alicyclic group bonded to the carbodiimide group, and an aromatic carbodiimide compound having an aromatic group or an aromatic group-containing group bonded to the carbodiimide group. The (D) carbodiimide compound may be used either singly or in combination of two or more types.

Specific examples of the aliphatic carbodiimide compound include diisopropyl carbodiimide and dioctyl decyl carbodiimide. Specific examples of the alicyclic carbodiimide compound include dicyclohexyl carbodiimide and the like.

Specific examples of the aromatic carbodiimide compound include a mono- or di-carbodiimide compound such as diphenyl carbodiimide, di-2,6-dimethylphenyl carbodiimide, N-tolyl-N'-phenyl carbodiimide, di-p-nitrophenyl carbodiimide, di-p-aminophenyl carbodiimide, di-p hydroxyphenyl carbodiimide, di-p-chlorophenyl carbodiimide, di-p-methoxyphenyl carbodiimide, di-3,4-dichlorophenyl carbodiimide, di-2,5-chlorophenyl carbodiimide, di-o-chlorophenyl carbodiimide, p-phenylene-bis-di-o-tolyl carbodiimide, p-phenylene-bis-dicyclohexyl carbodiimide, p-phenylene-bis-dichlorophenyl carbodiimide, or ethylene-bis-diphenyl carbodiimide; and a polycarbodiimide compound such as poly(4,4'-diphenylmethane carbodiimide), poly(3,5'-dimethyl-4,4'-diphenylmethane carbodiimide), poly(p-phenylene carbodiimide), poly(m-phenylene carbodiimide), poly(naphthylene carbodiimide), poly(1,3-diisopropylphenylene carbodiimide), poly(1-methyl-3,5-diisopropylphenylene carbodiimide), poly(1,3,5-triethylphenylene carbodiimide, or poly(triisopropylphenylene carbodiimide).

When the (D) carbodiimide compound is a polycarbodiimide compound, it preferably has molecular weight of 2000 or more. By using the polycarbodiimide compound having such molecular weight, generation of gas and malodor during melt-kneading or during molding can be inhibited.

Among the (D) carbodiimide compounds described above, di-2,6-dimethylphenyl carbodiimide, poly(4,4'-diphenylmethane carbodiimide), poly(phenylene carbodiimide), and poly(triisopropylphenylene carbodiimide) are preferably used.

In the invention, use amount of the (D) carbodiimide compound is not specifically limited if it is within the range in which the purpose of the invention is not impaired. The use amount of the (D) carbodiimide compound corresponds to the amount of carbodiimide functional group preferably within the range of 0.3 to 5.0 equivalents, and more preferably within the range of 0.5 to 3.0 equivalents when the amount of the terminal carboxyl groups in the (A) polybutylene terephthalate resin is set as 1.

If the use amount of the (D) carbodiimide compound is excessively small, the desired heat shock resistance may not be attained. If the use amount thereof is excessively large, there likely appears the generation of gel component and carbide at the time of melt-kneading and molding processing, and the deterioration of mechanical characteristics such as tensile strength or flexural strength may easily occur, and the rapid decrease in strength in a moist heat environment can be caused.

[(E) Filler]

The polybutylene terephthalate resin composition of the invention may also contain the (E) filler in addition to the (A) polybutylene terephthalate resin, the (B) halogenated benzylacrylate compound, the (C) antimony oxide compound, and the (D) carbodiimide compound. As for the (E) filler, various fillers including fibrous filler and non-fibrous filler (microparticle-like or plate-like) can be used depending on purpose of use. The filler may be used in combination of two or more types.

Among the fillers, examples of the fibrous filler include glass fiber, carbon fiber, potassium titanate fiber, silica-alumina fiber, zirconia fiber, silica fiber, boron nitride fiber, silicon nitride fiber, boron fiber, aluminum boronic acid fiber, metal fiber, and organic fiber, but not limited thereto.

Meanwhile, examples of the microparticle-like filler include silicate like silica, quartz powder, glass bead, glass powder, calcium silicate, kaolin, diatomaceous earth, and wollastonite, metal oxide like iron oxide, titanium oxide, zinc oxide, and alumina, metal carbonate like calcium carbonate and magnesium carbonate, metal sulfate like calcium sulfate and barium sulfate, silicon carbide, silicon nitride, boron nitride, and various metal powder, but not limited thereto. Further, examples of the plate-like filler include mica and glass flake, but not limited thereto.

Among the fillers described above, it is more preferable to use a fibrous filler since it can provide a polybutylene terephthalate composition with excellent mechanical properties. Among the fibrous fillers, from the viewpoint of a balance between an effect of improving mechanical properties and cost, glass fiber is preferably used.

For the glass fiber used in the invention, any of known glass fibers is preferably used irrespective of the fiber diameter and the cross-section shape (such as cylinder, cocoon, or elliptical cross section) of the glass fiber. Further, glass fiber with various shapes including chopped strand, milled fiber, roving, or the like can be used. Although the kind of glass which constitutes the glass fiber is not specifically limited in the invention, preferred ones are E-glass and corrosion-resistant glass containing zirconium element in view of the quality.

According to the invention, when the (E) filler is used, in order to improve the characteristic of interface between the filler and the resin matrix, a filler of which surface is treated by using an organic treatment agent such as amino silane compound or an epoxy compound is preferred. When a filler of which surface is treated by using an organic treatment agent is used, the use amount of an organic treatment agent is preferably 0.03% by mass or more and 5% by mass or less, and more preferably 0.3% by mass or more and 2% by mass or less per the mass of surface treated filler. The use amount of an organic treatment agent can be determined by measuring the reduced weight of a surface treated filler under heating. The organic treatment agent used for surface treatment of the filler in the invention is not specifically limited, and various surface treatment agents that are conventionally used as a surface treatment agent for a filler can be used.

Use amount of the (E) filler in the polybutylene terephthalate resin composition of the invention is not specifically limited if it is within the range in which the purpose of the invention is not impaired. The use amount of the (E) filler is preferably within the range of 20 parts by mass or more and 100 parts by mass or less, more preferably within the range of 20 parts by mass or more and 80 parts by mass or less, and particularly preferably within the range of 30 parts by mass or more and 60 parts by mass or less per 100 parts by mass of the (A) polybutylene terephthalate resin. By using the (E) filler in an amount within the range above, a polybutylene terephthalate resin composition having excellent heat shock resistance can be obtained additionally its mechanical properties and surface characteristics are also improved.

[(F) Elastomer]

The polybutylene terephthalate resin composition of the invention also preferably contains (F) elastomer in addition to the (A) polybutylene terephthalate resin, the (B) halogenated benzylacrylate compound, the (C) antimony oxide compound, and the (D) carbodiimide compound that are described above. By adding the (F) elastomer to the polybutylene terephthalate resin composition, an effect of improving heat shock resistance is obtained at higher level. When the (F) elastomer is added to the polybutylene terephthalate resin composition of the invention, it is also possible to add the (E) filler described above with the (F) elastomer.

The (F) elastomer that can be very preferably used in the invention is a thermoplastic elastomer or a core and shell-based elastomer. Specific examples of the thermoplastic elastomer include a grafted olefin-based elastomer, a styrene-based elastomer, and a polyester-based elastomer.

Use amount of the (F) elastomer in the polybutylene terephthalate resin composition of the invention is not specifically limited if it is within the range in which the purpose of the invention is not impaired. The use amount of the (F) elastomer is preferably within the range of 5 parts by mass or more and 30 parts by mass or less, and more preferably within the range of 10 parts by mass or more and 20 parts by mass or less per 100 parts by mass of the (A) polybutylene terephthalate resin. By using the (F) elastomer in an amount within the range above, particularly excellent heat shock resistance can be obtained.

Grafted Olefin-Based Elastomer

A grafted olefin-based elastomer that is used as the (D) elastomer of the invention is a copolymer composed mainly of ethylene and/or propylene, and there is preferably applicable a graft-copolymer chemically bonded by branching or cross-linking one or two or more of: (a-1) a copolymer of ethylene unsaturated carboxylic acid alkyl ester or (a-2) an olefin-based copolymer composed of α-olefin and glycidyl ester of α,β-unsaturated acid; and (b) a polymer or copolymer constituted mainly by repeating units represented by the general formula (1) below.

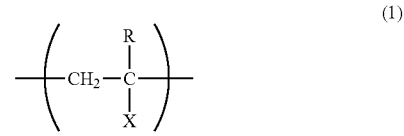

(in the formula (1), R represents a hydrogen atom or a C1 to C6 alkyl group, and X represents at least one group selected from a group consisting of $-COOCH_3$, $-COOC_2H_5$, $-COOC_4H_9$, $-COOCH_2CH(C_2H_5)C_4H_9$, a phenyl group, and a cyano group.)

Examples of the (a-1) ethylene unsaturated carboxylic acid alkyl ester copolymer include random copolymers such as an ethylene-methyl acrylic acid copolymer, an ethylene-methyl methacrylic acid copolymer, an ethylene-ethyl acrylic acid copolymer, or an ethylene-vinyl acrylate-ethyl acrylate copolymer. The (a-1) ethylene unsaturated carboxylic acid alkyl ester copolymer may be also a copolymer obtained by copolymerization of unsaturated carboxylic acid like acrylic acid and methacrylic acid within the range in which the purpose of the invention is not impaired. The copolymers may be used as mixture of two or more types.

Furthermore, the α-olefin as one of the monomers constituting the olefin-based copolymer of (a-2) includes ethylene, propylene, and butene-1. Of these, ethylene is preferably used.

Moreover, the glycidyl ester of α,β-unsaturated acid as another monomer constituting the (a-2) component is a compound represented by the general formula (2) below, including acrylic acid glycidyl ester, methacrylic acid glycidyl ester, and ethacrylic acid glycidyl ester. Among those glycidyl esters of α,β-unsaturated acid and methacrylic acid glycidyl ester are particularly preferably used.

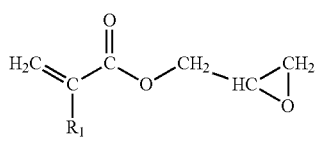

(in the formula (2), $R_1$ represents a hydrogen atom or a C1-C6 alkyl group.)

The olefin-based copolymer composed of α-olefin (such as ethylene) and glycidyl ester of α,β-unsaturated acid can be obtained by copolymerization through a known radical polymerization reaction between α-olefin and glycidyl ester of α,β-unsaturated acid. The most preferable ratio of the α-olefin to the glycidyl ester of α,β-unsaturated acid for production of the copolymer is preferably 70% by mass to 99% by mass of the α-olefin and 1% by mass to 30% by mass of the glycidyl ester of α,β-unsaturated acid.

The polymer or copolymer (b) which is graft-polymerized with the olefin-based copolymer (a-1) or (a-2) is a copolymer composed of a homopolymer constituted by containing only one repeating unit represented by the above formula (1) or a copolymer constituted by containing two or more types of them. Specific examples of the polymer or copolymer (b) include polymethyl methacrylate, polyethyl acrylate, polybutyl acrylate, poly(2-ethylhexyl acrylate), polystyrene, polyacrylonitrile, an acrylonitrile-styrene copolymer, a butyl acrylate-methyl methacrylate copolymer, and a butyl acrylate-styrene copolymer. Among the polymer and copolymer (b) described above, the butyl acrylate-methyl methacrylate copolymer is particularly preferably used. The polymer or copolymer (b) can be prepared by radical polymerization of corresponding vinyl-based monomers.

The graft copolymer preferably used in the invention is a graft copolymer having a branched or cross-linked structure in which the olefin-based copolymer (a-1) or (a-2) and the polymer or the copolymer (b) are chemically bonded at least at one position of the molecular structure. When the graft copolymer has a branched or cross-linked structure, more excellent effect of improving heat shock resistance can be obtained compared to a case in which only one of olefin-based copolymer (a-1), (a-2), or the polymer or the copolymer (b) is added to the polybutylene terephthalate resin composition. Herein, the ratio of (a-1) or (a-2) to (b) to constitute the graft copolymer is preferably within the range of 95:5 to 5:95 (mass ratio), and more preferably 80:20 to 20:80.

Styrene-Based Elastomer

As the styrene-based elastomer that can be suitably used as the (F) elastomer in the invention, a block copolymer composed of a polystyrene block and an elastomer block composed of a polyolefin structure can be used. Specific examples of the styrene-based elastomers include a styrene-isoprene-styrene block copolymer (SIS), a styrene-ethylene-propylene-styrene block copolymer (SEPS), styrene-ethylene-butylene-styrene block copolymer (SEBS), and styrene-ethylene-ethylene/propylene-styrene block copolymer (SEEPS).

Core and Shell-Based Elastomer

The core and shell-based elastomer that is used as the (F) elastomer in the invention has multilayer structure composed of a core layer (core part) and a shell layer which covers at least part of the surface of the core layer. The core and shell-based elastomer preferably has the core layer made of a rubber component (soft component). As a rubber component, an acrylate-based rubber is suitably used. The glass transition temperature (Tg) of the rubber component that is used for the core layer is, for example, preferably less than 0° C. (−10° C. or less, for example), more preferably −20° C. or less (−180° C. to −25° C., for example), and particularly preferably −30° C. or less (−150° C. to −40° C., for example).

The acrylate-based rubber used as the rubber component is preferably a polymer obtained by polymerization mainly of an acrylic monomer like alkyl acrylate. As an alkyl acrylate used as a monomer of the acrylate-based rubber, C1-C12 alkyl ester of acrylic acid such as butyl acrylate is preferable. More preferably, it is C2-C6 alkyl ester of acrylic acid.

The acrylate-based rubber may be a homopolymer or a copolymer of acrylate-based monomer. When the acrylate-based rubber is a copolymer of acrylate-based monomers, it may be a copolymer of acrylate-based monomers or a copolymer of an acrylate-based monomer and other monomer containing unsaturated bond. When the acrylate-based rubber is a copolymer, the acrylate-based rubber may be a copolymer obtained by copolymerization of a crosslinkable monomer.

Polyester-Based Elastomer

In the present invention, the polyester-based elastomer that is used as the (F) elastomer is not specifically limited, and various elastomers like polyether type and polyester type can be used if the flexural modulus is 1000 MPa or less, and preferably 700 MPa or less.

The polyether type polyester-based elastomer is a polyester elastomer composed of an aromatic polyester as the hard segment, and a polyester made of an oxyalkylene glycol polymer and dicarboxylic acid as the soft segment.

The aromatic polyester unit in the hard segment is a unit which is derived from a polycondensate of a dicarboxylic acid compound with dihydroxy compound, a polycondensate of an oxycarboxylic acid compound, or a polycondensate of a dicarboxylic acid compound, a dihydroxy compound, and an oxycarboxylic acid compound. Specific examples of the hard segment include a unit derived from polybutylene terephthalate.

The soft segment is introduced to the polyester-based elastomer as a compound obtained by polycondensation of polyalkylene ether with a dicarboxylic acid compound. Specific examples of the soft segment include a unit which is derived from an esterified compound of polyoxy tetramethylene glycol, which is derived from tetrahydrofuran.

As for the polyether-based elastomer, a synthesized elastomer or a commercially available elastomer can be used. Examples of the commercially available polyether-based elastomer include PELPRENE P-30B, P-70B, p-90B, and P-280B, manufactured by Toyobo Co., Ltd.; Hytrel 4057, 4767, 6347, and 7247, manufactured by Du Pont-Toray Co., Ltd. and; Riteflex 655 manufactured by Ticona LLC; or the like.

The polyester type elastomer is a polyester elastomer composed of an aromatic polyester unit as the hard segment and an amorphous polyester unit as the soft segment. The aromatic polyester unit in the hard segment is the same as that of the above polyether type elastomer. Examples of the amorphous polyester unit in the soft segment include a ring-opening polymerization polymer of lactone and a unit derived from polycondensate between an aliphatic dicarboxylic acid and an aliphatic diol.

As for the polyester type elastomer, a synthesized elastomer or a commercially available elastomer can be used. Examples of the commercially available polyester type elastomer include PELPRENE S-1002 and S-2002, manufactured by Toyobo Co., Ltd.

[Other Components]

Depending on the application of a molded article, it may be sometimes required to have flammability classification of "V-0" described by UL standard 94. In such case, it is preferable that the polybutylene terephthalate resin composition of the invention is added with an anti-dripping agent like a fluorine-based resin together with a flame retardant.

Examples of the fluorine-based resin that is suitably used as an anti-dripping agent include a homopolymer or a copolymer of a fluorine-containing monomer such as tetra fluoroethylene, chlorotrifluoroethylene, vinylidene fluoride, hexafluoropropylene, or perfluoroalkyl vinyl ether, and a copolymer of the above-described fluorine-containing monomer with a copolymerizable monomer such as ethylene, propylene, or (meth)acrylate. These fluorine-based resins can be used either singly or in combination of two or more of them.

Examples of that type of fluorine-based resin include a homopolymer such as polytetrafluoroethylene, polychloro trifluoroethylene, or polyvinylidene fluoride, a copolymer such as a tetra fluoroethylene-hexafluoropropylene copolymer, a tetra fluoroethylene-perfluoroalkyl vinyl ether copolymer, an ethylene-tetra fluoroethylene copolymer, or an ethylene-chlorotrifluoroethylene copolymer.

The addition amount of the fluorine-based resin is preferably, for example, 10 parts by mass or less per 100 parts by mass of the (A) polybutylene terephthalate resin, more preferably 0.1 parts by mass to 5 parts by mass, and still more preferably 0.2 parts by mass to 1.5 parts by mass.

Furthermore, to the polybutylene terephthalate resin composition according to the invention, there may be added, if required depending on the purpose, various additives such as an antioxidant, a heat stabilizer, a UV absorber, an anti-static agent, a dye, a pigment, a lubricating agent, a plasticizer, a mold-releasing agent, a crystallization promoting agent, a crystal nucleating agent, or an epoxy compound.

[Method for Producing Polybutylene Terephthalate Resin Composition]

The polybutylene terephthalate resin composition of the invention can be produced by various methods that are conventionally known as a method for producing a thermoplastic resin composition. Examples of a suitable method for producing the polybutylene terephthalate resin composition of the invention include a method including kneading and extruding each components by using a melt extruder like a single screw or a twin screw extruder to give pellets.

Further, the (D) carbodiimide compound may be added as a master batch having a thermoplastic resin as a matrix. The master batch of the (D) carbodiimide compound is preferably the one in which the polybutylene terephthalate resin is used as a matrix. However, a master batch having other thermoplasitc resin like polyethylene terephthalate resin as a matrix can be also used.

The polybutylene terephthalate resin composition of the invention preferably has 300 Pa·s or less of the melt viscosity at a temperature of 260° C. and a shear rate of 1000 sec-1 that is measured in accordance with ISO 11443. The melt viscosity is more preferably 250 Pa·s or less. As the polybutylene terephthalate resin composition of the invention exhibits the melt viscosity as described above, it shows excellent fluidity during molding and has little molding defects such as short shot.

Since the polybutylene terephthalate resin composition of the invention that is obtained as described above has excellent heat shock resistance, flame retardancy, and hydrolysis resistance, it can be suitably used for various applications including an insert component or the like. In particular, since a crack is not easily caused by heat shock even under an environment of severe temperature increase and decrease, it is suitably used as a material for an insert molded article in an automobile application.

Insert Molded Article

As used herein, the term "insert molded article" is a composite molded article obtained by placing in advance a metal or the like in a mold for molding and filling the resin composition outside the metal. As a method for filling a resin in a mold, there are an injection molding, an extrusion molding, and a compression molding. An injection molding is commonly practiced. Further, since the material to be inserted into the resin is used for the purpose of enhancing the characteristics of the insert and complementing problems of the resin, a material which does not undergo any deformation of shape or melting when in contact with the resin during molding is used. For such reasons, metals like aluminum, magnesium, copper, iron, brass, and an alloy thereof or inorganic solids like glass and ceramics that are already molded into a bar, a pin, a screw, or the like are generally used.

A member to be inserted into a molded article is preferably a thin plate-like member. Size and thickness or the like of the member can be determined depending on size and structure of a molded article to which the member is inserted. It is not necessarily required that the member to be inserted into a molded article covers entirety of the molded article. Instead, it may be related to only a part of the molded article. Shape, size, thickness, or the like of the molded article is not specifically limited as long as it is mounted (assembled integrally) on a high voltage resistant member. Any one of a plate-like (a disc, a polygon, or the like), a cylinder shape, a box shape, a bowl shape, and a tray shape or the like can be employed. In case of a large size molded article or a complex molded article, it is not necessary that the thickness is homogeneous over entire region of the molded article, and reinforcement ribs may be included in the molded article.

Since the insert molded article of the invention exhibits excellent flame retardancy and heat shock resistance, it can be appropriately used for an electric and electronic component installed in a general household electronic products and an OA machine, a component of a mechanical apparatus, and a component of an automobile.

Further, it is also appropriately used as a component of an electric automobile which requires durability as an automobile and flame retardancy as an electric and electronic component. Examples of the electric automobile component include, although not specifically limited, a case for enclosing a power module, a step-up type DC/DC converter, a step-down type DC/DC converter, a condenser, an insulator, a terminal base of a motor, a battery, an electric compressor, a sensor for battery electricity, a junction block, or the like.

EXAMPLES

Herein below, the invention is described in greater detail in view of the examples. However, it is evident that the invention is not limited to the examples.

Examples 1 to 3 and Comparative Examples 1 to 8

In the Examples 1 to 3 and Comparative examples 1 to 8, the following materials were used as a component of the polybutylene terephthalate resin composition.

[Polybutylene Terephthalate Resin (PBT)]

A-1: product of WinTech polymer, Ltd. (Intrinsic viscosity of 0.69, terminal carboxyl group amount of 24 meq/kg).

[Flame Retardant]

B-1: Brominated benzylacrylate (FR1025, manufactured by ICL-IP Japan, Ltd., bromine content of 72% by mass)

B-2: Brominated polycarbonate (Fire guard 7500, manufactured by Teijin Chemicals, Ltd., bromine content of 56% by mass)

B-3: Brominated phthalimide (SAYTEX BT93W, manufactured by Albemarle Japan Corporation, bromine content of 67% by mass)

B-4: Brominated epoxy compound (SRT5000S, manufactured by Sakamoto Yakuhin Kogyo, Co., Ltd., bromine content of 53% by mass)

[Antimony Compound]

C-1: Antimony trioxide (PATOX-M, manufactured by Nihon Seiko Co., Ltd.)

C-2: Antimony pentoxide (Sun Epoch NA1030, manufactured by NISSAN CHEMICAL INDUSTRIES, LTD.)

[Carbodiimide Compound]

D-1: Aromatic carbodiimide (STABAXOL P, manufactured by Rhein Chemic Japan)

[Glass Fiber]

E-1: Glass fiber (CS3J948S, manufactured by Nitto Boseki Co., Ltd.)

[Elastomer]

F-1: Core and shell-based elastomer (PARALOID EXL 2314, manufactured by Rohm and Haas Japan Company)

F-2: Olefin-based elastomer (MODIPER A5300, manufactured by NOF Corporation)

F-3: Styrene-based elastomer (SEPTON 4055, manufactured by Kuraray Co., Ltd.)

[PTFE]

Polytetrafluoroethylene resin (FLUON CD-076, manufactured by Asahi Glass Co., Ltd.)

[Plasticizer]

Alcohol ester mixed with pyromellitic acid (ADK CIZER UL-100, manufactured by ADEKA Corporation)

The respective components of the Table 1 with a ratio of the content (based on parts by mass) given in the Table 1 were dry-blended together. The blend was then melt-kneaded using a twin screw extruder (TEX-30, manufactured by The Japan Steel Works, Ltd.) at the conditions of a cylinder temperature of 260° C., an extrusion rate of 15 kg/h, and a screw rotational speed of 150 rpm, to form pellets of the polybutylene terephthalate resin composition. By using the pellets obtained, a test specimen was prepared and heat shock resistance, tensile strength, tensile elongation, flexural strength, flexural modulus, Charpy impact strength, flame retardancy, and hydrolysis resistance (pressure cooker test) were measured for the polybutylene terephthalate resin composition. Measurement results of the heat shock resistance, tensile strength, tensile elongation, flexural strength, flexural modulus, Charpy impact strength, and flame retardancy of the polybutylene terephthalate resin composition of the Examples 1 to 5 are given in the Table 1, and the measurement results of the hydrolysis resistance are given in the Table 3. Further, the measurement results of the heat shock resistance, tensile strength, tensile elongation, flexural strength, flexural modulus, Charpy impact strength, and flame retardancy of the polybutylene terephthalate resin composition of the Comparative examples 1 to 8 are given in the Table 2, and the measurement results of the hydrolysis resistance are given in the Table 4.

Each physical property of the polybutylene terephthalate resin composition was measured according to the method described below.

Heat Shock Resistance

For producing a test piece, injection molding of an insert molded article was carried out by using a mold for inserting an iron core of 18 mm in length, 18 mm in width, and 30 mm in height into a square column of 22 mm in length, 22 mm in width, and 51 mm in height, so as to provide 1 mm of minimum wall thickness of a portion of the molded resin part. With a heating and cooling shock testing machine, the insert molded article was subjected to a heat shock resistance test by the cycles of: heating to 140° C. and holding the temperature for one and a half hours; cooling to −40° C. and holding the temperature for one and a half hours; and heating to 140° C., and the number of cycles when crack appeared on the molded article was determined to evaluate the heat shock resistance. The test was carried out until the cycle No. 400.

Melt Viscosity

The melt viscosity was determined in accordance with ISO 1143, at a cylinder temperature of 260° C. and shear rate of 1000 sec$^{-1}$.

Tensile Strength and Tensile Elongation

Tensile strength and tensile elongation were determined in accordance with ISO 527-1 and 2.

Flexural Strength and Flexural Modulus

Flexural strength and flexural modulus were determined in accordance with ISO 178.

Charpy Impact Strength

Charpy impact strength was determined in accordance with ISO 179/1eA.

Flame Retardancy

A test piece (0.75 mm of thickness) was tested by the vertical position flame test specified by UL-94 Standard of Underwriter's Laboratories Inc.

Hydrolysis Resistance (Pressure Cooker Test)

Injection molding was carried out to prepare ISO 3167 tensile test piece under the condition of a resin temperature of 260° C., a mold temperature of 80° C., an injection time of 15 sec, and a cooling time of 15 sec, and the tensile strength and tensile elongation were measured in accordance with ISO 527-1 and 2. After that, by using the pressure cooker tester, the tensile test piece was exposed to an environment of 121° C. and 100% RH for 25 hours, 50 hours, or 75 hours. From the tensile strength and tensile elongation measured before and after the exposure, the tensile strength retention rate and the tensile elongation retention rate of the test piece after the exposure compared to the piece before the exposure were calculated.

TABLE 1

|  |  | Examples | | | | | | |
|---|---|---|---|---|---|---|---|---|
|  |  | 1 | 2 | 3 | 4 | 5 | 6 | 7 |
| A: PBT | content | 100 | 100 | 100 | 100 | 100 | 100 | 100 |
| B: Flame | kind | B-1 | B-1 | B-1 | B-1 | B-1 | B-1 | B-1 |
| retardant | content | 17.5 | 20.1 | 20.3 | 21.4 | 21.7 | 20.1 | 20.1 |
| C: Antimony | kind | C-1 | C-1 | C-1 | C-1 | C-1 | C-1 | C-1 |

TABLE 1-continued

|  |  | Examples | | | | | | |
|---|---|---|---|---|---|---|---|---|
|  |  | 1 | 2 | 3 | 4 | 5 | 6 | 7 |
| compound | content | 7.6 | 8.7 | 8.8 | 9.3 | 9.4 | 8.7 | 8.7 |
| D: Carbodiimide compound | content | 0.9 | 1.0 | 2.1 | 1.1 | 2.2 | 1.0 | 1.0 |
| E: fiber | content | 54.2 | 62.1 | 62.8 | 66.2 | 67.0 | 62.1 | 62.1 |
| F: Elastomer | content | — | 14.5 | 14.6 | 15.5 | 15.6 | 14.5 | 14.5 |
| PTFE | content | 0.5 | 0.6 | 0.6 | 0.7 | 0.7 | 0.6 | 0.6 |
| Plasticizer | content | — | — | — | 6.6 | 6.7 | — | — |
| Equivalent of carbodiimide group *1 | content | 1.2 | 1.4 | 2.7 | 1.4 | 2.9 | 1.4 | 1.4 |
| bromine content | wt % | 7 | 7 | 7 | 7 | 7 | 7 | 7 |
| heat shock resistance | Number of times | 179 | 400< *2 | 400< *2 | 400< *2 | 400< *2 | 400< *2 | 400< *2 |
| Melt viscosity | Pa·s | 231 | 270 | 271 | 262 | 261 | 240 | 272 |
| tensile strength | MPa | 150 | 120 | 118 | 115 | 112 | 118 | 110 |
| tensile elongation | % | 2.2 | 2.3 | 2.4 | 2.5 | 2.6 | 2.3 | 2.3 |
| flexural strength | MPa | 233 | 195 | 193 | 186 | 185 | 188 | 191 |
| flexural modulus | MPa | 10500 | 9150 | 8850 | 9150 | 8860 | 9000 | 8900 |
| Charpy impact strength | kJ/m$^2$ | 10.1 | 11.0 | 10.9 | 11.1 | 10.8 | 11.0 | 10.9 |
| flame retardancy |  | V-0 | V-0 | V-0 | V-0 | V-0 | V-0 | V-0 |

*1: Equivalent of a carbodiimide group in a carbodiimide compound per amount of a terminal carboxyl group in PBT
*2: "400<" indicates that no crack was represented until the cycle No. 400 according to the heat shock resistance test.

TABLE 2

|  |  | Comparative examples | | | | | | | |
|---|---|---|---|---|---|---|---|---|---|
|  |  | 1 | 2 | 3 | 4 | 5 | 6 | 7 | 8 |
| A: PBT | content | 100 | 100 | 100 | 100 | 100 | 100 | 100 | 100 |
| B: Flame retardant | kind | B-1 | B-1 | B-2 | B-2 | B-3 | B-4 | B-4 | B-4 |
|  | content | 17.4 | 21.2 | 23.6 | 23.8 | 19.1 | 19.3 | 25.7 | 25.9 |
| C: Antimony compound | kind | C-1 | C-1 | C-1 | C-1 | C-1 | C-1 | C-2 | C-2 |
|  | content | 7.5 | 9.2 | 7.9 | 8.0 | 7.6 | 7.7 | 8.9 | 19.0 |
| D: Carbodiimide compound | content | — | — | — | 1.0 | — | 0.9 | — | 1.0 |
| E: fiber | content | 53.8 | 65.5 | 56.6 | 57.1 | 54.5 | 55.0 | 57.9 | 58.5 |
| F: Elastomer | content | — | 15.3 | — | — | — | — | — | — |
| PTFE | content | 0.5 | 0.7 | 0.6 | 0.6 | 0.5 | 0.6 | 0.6 | 0.6 |
| Plasticizer | content | — | 6.6 | — | — | — | — | — | — |
| Equivalent of carbodiimide group *1 | content | — | — | — | 1.2 | — | 1.2 | — | 1.3 |
| bromine content | wt % | 7 | 7 | 7 | 7 | 7 | 7 | 7 | 7 |
| heat shock resistance | Number of times | 26 | 150 | 56 | 61 | <20 | 38 | <20 | 62 |
| Melt viscosity | Pa·s | 187 | 199 | 265 | 256 | 174 | 212 | 189 | 224 |
| tensile strength | MPa | 154 | 115 | 157 | 155 | 152 | 149 | 154 | 155 |
| tensile elongation | % | 2.1 | 2.3 | 2.1 | 2.2 | 2.2 | 2.2 | 2.0 | 2.1 |
| flexural strength | MPa | 236 | 184 | 241 | 234 | 236 | 232 | 231 | 231 |
| flexural modulus | MPa | 10780 | 9100 | 10600 | 10500 | 10600 | 10500 | 10700 | 10600 |
| Charpy impact strength | kJ/m$^2$ | 10.2 | 10.5 | 8.8 | 8.3 | 9.6 | 9.5 | 8.5 | 8.6 |
| flame retardancy |  | V-0 | V-0 | V-0 | V-0 | V-0 | V-0 | V-0 | V-0 |

*1: Equivalent of a carbodiimide group in a carbodiimide compound per amount of a terminal carboxyl group in PBT

TABLE 3

| | | Examples | | | | | | |
|---|---|---|---|---|---|---|---|---|
| | | 1 | 2 | 3 | 4 | 5 | 6 | 7 |
| tensile strength retention rate | 25 hr | 91% | 92% | 94% | 93% | 95% | 94% | 94% |
| | 50 hr | 79% | 84% | 80% | 85% | 79% | 88% | 85% |
| | 75 hr | 61% | 77% | 67% | 75% | 66% | 80% | 80% |
| tensile elongation retention rate | 25 hr | 81% | 70% | 70% | 70% | 70% | 72% | 70% |
| | 50 hr | 66% | 58% | 49% | 60% | 48% | 60% | 58% |
| | 75 hr | 43% | 46% | 35% | 45% | 36% | 52% | 50% |

TABLE 4

| | | Comparative examples | | | | | | | |
|---|---|---|---|---|---|---|---|---|---|
| | | 1 | 2 | 3 | 4 | 5 | 6 | 7 | 8 |
| tensile strength retention rate | 25 hr | 83% | 94% | 89% | 87% | 84% | 92% | 87% | 92% |
| | 50 hr | 55% | 80% | 75% | 73% | 57% | 76% | 70% | 81% |
| | 75 hr | 31% | 50% | 53% | 64% | 33% | 49% | 53% | 69% |
| tensile elongation retention rate | 25 hr | 73% | 79% | 78% | 74% | 75% | 89% | 79% | 85% |
| | 50 hr | 49% | 59% | 62% | 59% | 51% | 63% | 59% | 68% |
| | 75 hr | 28% | 31% | 39% | 50% | 30% | 40% | 47% | 54% |

From the Table 1 to Table 4, it was found that the polybutylene terephthalate resin composition of the Examples 1 to 5 in which a brominated benzylacrylate compound (flame retardant B-1), an antimony oxide compound, and a carbodiimide compound are added to a polybutylene terephthalate resin has excellent heat shock resistance, flame retardancy, and hydrolysis resistance while having unimpaired mechanical properties.

From the comparison of the Example 1 and the Comparative example 4, Comparative example 6, and Comparative example 8, it was found that the polybutylene terephthalate resin composition in which brominated polycarbonate, brominated phthalimide, and brominated epoxy compound are used as a flame retardant together with a carbodiimide compound has only minor improvement in heat shock resistance, even when the carbodiimide compound is used therein.

From the comparison of the Example 1 and Example 2, and Example 3, it was found that, by adding an elastomer as well as a brominated benzylacrylate compound (flame retardant B-1), an antimony oxide compound, and a carbodiimide compound to the polybutylene terephthalate resin composition, particularly excellent effect of improving heat shock resistance is obtained.

The invention claimed is:

1. An insert molded article formed by insert molding of a resin composition and an inserted member made of a metal or an inorganic solid, wherein the resin composition comprises:
   a polybutylene terephthalate resin (A);
   a halogenated benzylacrylate compound (B);
   an antimony oxide compound (C); and
   a carbodiimide compound (D),
   wherein said carbodiimide compound (D) is an aromatic carbodiimide compound, and
   wherein content of the carbodiimide compound (D) is an amount that makes the amount of the carbodiimide functional group to be at least 0.3 equivalents and no more than 5.0 equivalents, when the terminal carboxyl equivalent of the polybutylene terephthalate resin is set as 1.

2. The insert molded article according to claim 1, wherein an amount of a terminal carboxyl of the polybutylene terephthalate resin (A) is no more than 30 meq/kg.

3. The insert molded article according to claim 1, wherein the resin composition further comprises a filler (E).

4. The insert molded article according to claim 3 wherein the above-described filler (E) is a glass fiber.

5. The insert molded article according to claim 1, wherein the resin composition further comprises an elastomer (F).

6. The insert molded article according to claim 1, wherein content of the (B) halogenated benzylacrylate compound is at least 10 parts by mass and no more than 35 parts by mass and content of the (C) antimony oxide compound is at least 1 part by mass and no more than 20 parts by mass per 100 parts by mass of the (A) polybutylene terephthalate resin.

* * * * *